US011729279B2

(12) United States Patent
Khosrowpour et al.

(10) Patent No.: US 11,729,279 B2
(45) Date of Patent: Aug. 15, 2023

(54) SYSTEM AND METHOD FOR REMOTE ASSISTED OPTIMIZATION OF NATIVE SERVICES

(71) Applicant: Dell Products, L.P., Round Rock, TX (US)

(72) Inventors: Farzad Khosrowpour, Pflugerville, TX (US); Mitchell Anthony Markow, Hutto, TX (US); Liam B. Quinn, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 244 days.

(21) Appl. No.: 17/146,266

(22) Filed: Jan. 11, 2021

(65) Prior Publication Data

US 2022/0224759 A1    Jul. 14, 2022

(51) Int. Cl.
*H04L 67/51* (2022.01)
*G06N 20/00* (2019.01)
*H04L 67/30* (2022.01)
*H04L 67/02* (2022.01)

(52) U.S. Cl.
CPC ............ *H04L 67/51* (2022.05); *G06N 20/00* (2019.01); *H04L 67/02* (2013.01); *H04L 67/30* (2013.01)

(58) Field of Classification Search
CPC ......... H04L 67/51; H04L 67/02; H04L 67/30; H04L 67/10; G06F 9/452; G06F 9/547; G06F 2209/544; G06N 20/00
See application file for complete search history.

(56) References Cited

U.S. PATENT DOCUMENTS

| 10,810,502 | B2* | 10/2020 | Pillai | G06N 5/04 |
|---|---|---|---|---|
| 11,397,658 | B1* | 7/2022 | Pang | G06F 11/301 |
| 2020/0104184 | A1* | 4/2020 | Subramanian | G06N 3/08 |
| 2020/0389375 | A1* | 12/2020 | Haze | G06F 9/505 |
| 2021/0014133 | A1* | 1/2021 | Maciocco | H04L 41/5009 |
| 2021/0263749 | A1* | 8/2021 | Laskawiec | G06F 9/44505 |

\* cited by examiner

*Primary Examiner* — Benjamin M Thieu
(74) *Attorney, Agent, or Firm* — Fogarty LLP

(57) ABSTRACT

Embodiments of systems and methods for remote assisted optimization of applications executed by an Information Handling System (IHS) are described. In an illustrative, non-limiting embodiment, an IHS may include computer-executable instructions for determining one or more application performance features of a target application using an application machine learning (ML) engine, and generating one or more application profile recommendations for the target application according to the determined application performance features. Using the profile recommendations, the instructions adjust one or more settings of the IHS to optimize a performance of the target application, and transmit the application profile recommendations to a server that is configured to provide a service for the target application. The server then uses the one or more application profile recommendations to provision the service for use by the target application.

18 Claims, 5 Drawing Sheets

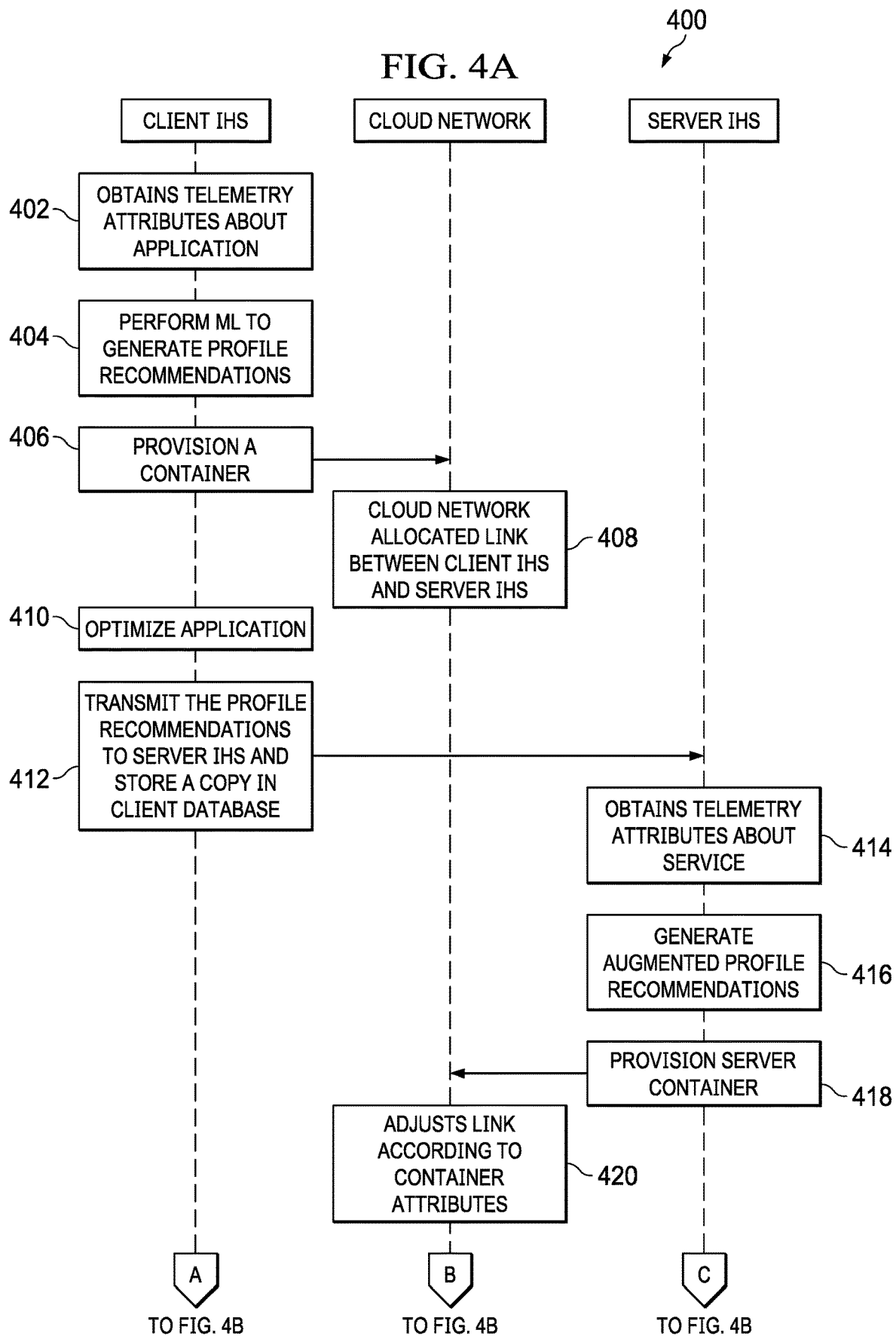

SYSTEM AND METHOD FOR REMOTE ASSISTED OPTIMIZATION OF NATIVE SERVICES

FIELD

The present disclosure relates generally to Information Handling Systems (IHSs), and more particularly, to a system and method for remote assisted optimization of native services.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs often communicate through networks to perform processing tasks commonly referred to as cloud services. Generally, client IHSs establish communication through a network to a server IHS to perform many types of cloud services. Different types of networks support different types of communication at different data transfer rates. Example of networks include, but are not limited to, the Internet, the public switched telephone network (PSTN), and the wireless radio networks of cell phone telecommunication providers.

Fifth generation (5G) cellular networks have their service areas divided into smaller geographical areas or "cells." Wireless devices located in a cell connect to the 5G network by radio waves through an antenna. Unlike its predecessors, 5G networks support very large bandwidth communications, of up to 10 gigabits per second, yielding numerous new cloud services that can be provided. 5G also introduces the concept of cellular network slicing. Specifically, 5G network slicing enables the multiplexing of virtualized and independent logical networks on the same physical network infrastructure. Each network slice is an isolated end-to-end network tailored to fulfill diverse Quality-of-Service or "QoS" requirements requested by a given target application executed on the client IHS.

However, as the inventors hereof have recognized, conventional cloud services implementations only provide optimization by either the server IHS or client IHS without regard for each others unique requirements. It is with these concerns that embodiments of the present disclosure are disclosed herein.

SUMMARY

Embodiments of systems and methods for remote assisted optimization of applications executed by an Information Handling System (IHS) are described. In an illustrative, non-limiting embodiment, an IHS may include computer-executable instructions for determining one or more application performance features of a target application using an application machine learning (ML) engine, and generating one or more application profile recommendations for the target application according to the determined application performance features. Using the profile recommendations, the instructions adjust one or more settings of the IHS to optimize a performance of the target application, and transmit the application profile recommendations to a server that is configured to provide a service for the target application. The server then uses the one or more application profile recommendations to provision the service for use by the target application.

In another illustrative, non-limiting embodiment, the instructions are further executed to provision a communication link between the IHS and the server according to the application profile recommendations. Because certain cloud communication networks, such as a fifth generation (5G) technology cellular network, may provide communication links with varying quality-of-service (QoS) capabilities, embodiments of the present disclosure leverage this capability to adjust the communication links according to the performance requirements of the application that uses the link. In some cases, the communication link may be provisioned by generating a container comprising one or more network functions (NFs).

In another illustrative, non-limiting embodiment, the server is configured to provision the service by determining certain service performance features of the service using a service ML engine, generate one or more service profile recommendations for the service according to these service performance features, and adjust one or more settings of the service to optimize a performance of the service using the service profile recommendations. The server may also be configured to store the service profile recommendations in a server memory, and at a later point in time when a communication link between the IHS and the server deleted and then re-established, adjust one or more settings of the service to optimize a performance of the service using the service profile recommendations.

In yet another illustrative, non-limiting embodiment, the instructions may receive the service profile recommendations from the server, augment the application profile recommendations according to the received service profile recommendations, and adjust the settings of the IHS to further optimize the performance of the target application.

In yet another illustrative, non-limiting embodiment, the instructions may repeat the aforecited actions at ongoing intervals or when a specified threshold of at least one of the application performance features has been crossed.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIGS. 4A and 4B illustrate an example method depicting how the client IHS may function with the server IHS to provide an end-to-end (E2E) optimization of a service provided to the application.

DETAILED DESCRIPTION

Embodiments of the present disclosure provide a system and method for remote assisted machine learning (ML) optimization of native services in which both client IHSs and server IHSs communicate in an iterative fashion to optimize services that are provide by the server IHSs to the client IHSs. Whereas conventional cloud service implementations only provide optimization by either the server IHS or client IHS without regard for each others unique requirements, embodiments of the present disclosure provide a technique in which optimization performed on the client IHS may generate profile recommendations that can be shared with a corresponding ML optimization performed on the server IHS to further augment the resulting optimization provided to the service provided by the server IHS. Moreover, the server IHS may share its profile recommendations with the client IHS to further augment the resulting optimization provided to the application using the service.

Today's cloud services have the capability of hosting services to many clients concurrently. Many current implementations, such as VMWARE's HORIZON and AIRWATCH, may provide virtual services to remote clients. The implementations typically involve clients configured with agents or virtual machines that provide connectivity to these hosted services. Provisioning, however, is typically accomplished using basic device type capabilities and services managed manually by cloud administrators. These implementations are mostly targeted for an enterprise environment and often require fixed latency, high bandwidth communication links, such as those provided by land lines. In such cases, optimization of performance is usually considered to be a server role due to the relatively large levels of computational load on the clients, thus making it impractical. While servers in the cloud are optimized to serve a proper number of clients, the network is usually one of the main bottlenecks for data (e.g., payload, telemetry data, etc.) transfer. Local area network (LAN) connectivity may reduce mobility, and in many cases, is still impractical. Additionally, the client does not have a role for orchestrated optimization with the cloud services once provisioning of the service's role is complete.

With the emergence of 5G technology, latency and bandwidth limitations of traditional communication networks (3G, 4G, etc.) can be reduced by nearly a factor of 10. Given this relatively large enhancement of throughput, the client devices could otherwise leverage the 5G network enhanced capabilities for real time transfer of telemetry data. However, conventional cloud services, as described herein above, do not possess the ability to receive optimization profiles from remote servers that remain relevant to the running workloads of client applications in a timely manner.

Figure 1:
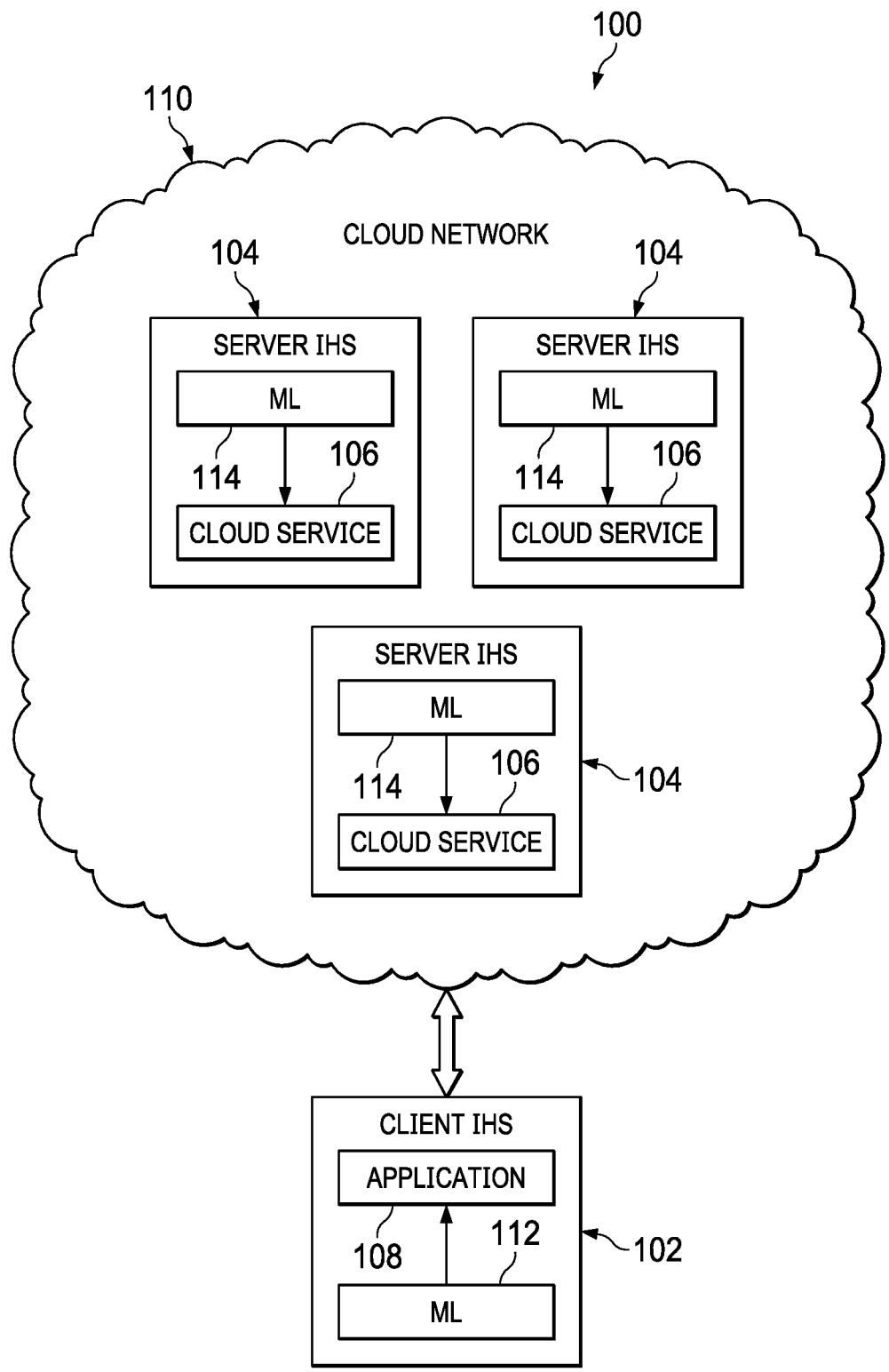
FIG. 1 illustrates an example iterative cloud service optimization system according to one embodiment of the present disclosure.

FIG. 1 illustrates an example iterative cloud service optimization system 100 according to one embodiment of the present disclosure. System 100 includes a client IHS 102 in communication with one or more server IHSs 104 that each serves one or more services 106 to an application 108 executed on client IHS 102 via a cloud communication network 110. client IHS 102 includes a machine learning (ML) engine 112 to optimize performance of the application 108, while server IHS 104 includes a service ML engine 114 to optimize performance of the service 106 provided to the client IHS 102. As will be described in detail herein below, application ML engine 112 transmits its profile recommendations to the service ML engine 114 to augment optimization of the performance provided to service 106, while service ML engine 114 in turn, transmits its profile recommendations to the application ML engine 112 to augment optimization of the performance provided to application 108. The sharing of profile recommendations can be performed over a number of cycles to iteratively improve the level of performance provided by both the application 108 and the service 106 provided to the application 108.

With the newly emerging 5G telecommunications network topology, the number and type of services provided to clients can vary widely. For example, three representative service categories have been defined: enhanced mobile broadband (eMBB); ultra-reliable and low latency communications (uRLLC); and massive machine type communications (mMTC). eMBB largely relates to bandwidth, the amount of data that can be transmitted in any given time period. URLLC, on the other hand, largely relates to how quickly data is guaranteed to reach a destination. mMTC relates largely to fully automatic data generation, processing, exchange, and actuation between machines. Nevertheless, real world use cases may not necessarily be solely eMBB, uRLLC, or mMTC, but rely on a mixture of the properties of the three.

For example, viewing of ultra-high definition (UHD) video or 3D video requires massive bandwidth with some reliability and latency requirements and is therefore closer to the eMBB service category. "Internet of things" (IOT) devices exemplified by interacting sensors triggering a staggering number of messages, machine interactions, and automated actions are closer to the mMTC service category, while self-driving cars are expected to be particularly reliant on fast and reliable messaging and are therefore closer to the uRLLC service category. Other services having requirements between the three service categories may include industry automation, which can be viewed as communications similar to mission critical IOT, but with more relaxed timing and reliability needs but higher data needs, perhaps for interfacing with humans. Multi-media (voice, video) communications, gaming, and UHD/3D video may involve communication to or with a human, which have certain latency/reliability requirements largely due to individual's reliance on feedback. Gaming differs somewhat in that it needs more data bandwidth than voice/video communications, but has similar latency/reliability requirements. Additionally, UHD/3D video viewing requires a relatively higher level of bandwidth while caching at or near the display device, which may result in relaxed latency and reliability requirements. Thus, it can be seen that services provided by the 5G network topology may vary to a relatively large degree such that cooperative optimization provided by both client IHS 102 and server IHS 104 may not only be beneficial, but required to fully realize the overall performance improvements that can be provided by the new 5G networks.

Figure 2:
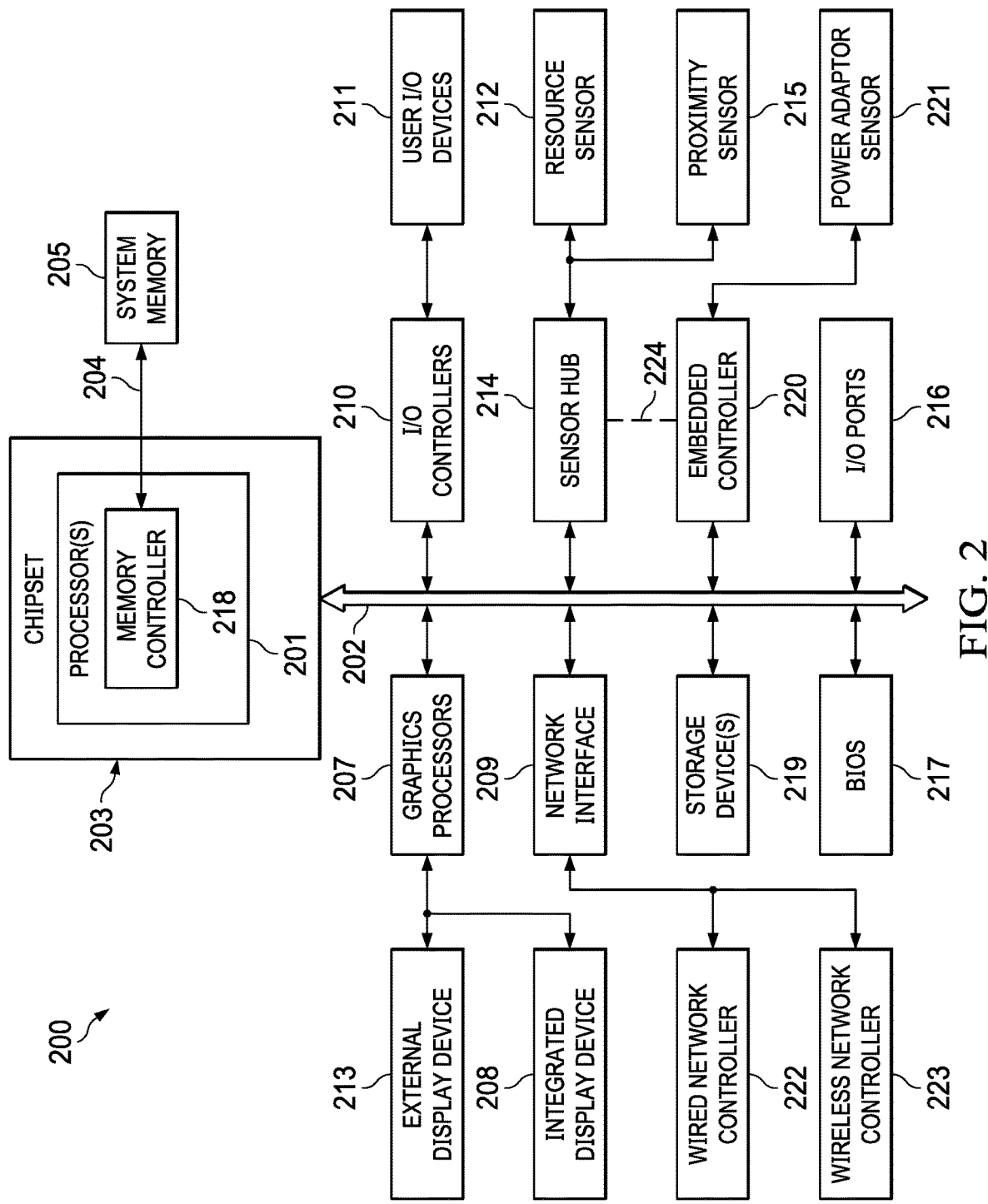
FIG. 2 is a block diagram illustrating example components of example IHS configured to manage a communication link with a wireless docking station according to one embodiment of the present disclosure.

FIG. 2 is a block diagram illustrating components of example IHS 200 configured to manage a communication link with a wireless docking station according to one embodiment of the present disclosure. IHS 200 may be implemented in whole, or as a part of client IHS 102, or server IHS 104. As shown, IHS 200 includes one or more processors 201, such as a Central Processing Unit (CPU), that execute code retrieved from system memory 205. Although IHS 200 is illustrated with a single processor 201, other embodiments may include two or more processors, that may each be configured identically, or to provide specialized processing operations. Processor 201 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 2, processor 201 includes an integrated memory controller 218 that may be implemented directly within the circuitry of processor 201, or memory controller 218 may be a separate integrated circuit that is located on the same die as processor 201. Memory controller 218 may be configured to manage the transfer of data to and from the system memory 205 of IHS 200 via high-speed memory interface 204. System memory 205 that is coupled to processor 201 provides processor 201 with a high-speed memory that may be used in the execution of computer program instructions by processor 201.

Accordingly, system memory 205 may include memory components, such as static RAM (SRAM), dynamic RAM (DRAM), and/or NAND Flash memory, suitable for supporting high-speed memory operations by the processor 201. In certain embodiments, system memory 205 may combine both persistent, non-volatile memory and volatile memory. In certain embodiments, system memory 205 may include multiple removable memory modules.

IHS 200 utilizes chipset 203 that may include one or more integrated circuits that are connect to processor 201. In the embodiment of FIG. 2, processor 201 is depicted as a component of chipset 203. In other embodiments, all of chipset 203, or portions of chipset 203 may be implemented directly within the integrated circuitry of the processor 201. Chipset 203 provides processor(s) 201 with access to a variety of resources accessible via bus 202. In IHS 200, bus 202 is illustrated as a single element. Various embodiments may utilize any number of separate buses to provide the illustrated pathways served by bus 202.

In various embodiments, IHS 200 may include one or more I/O ports 216 that may support removable couplings with various types of external devices and systems, including removable couplings with peripheral devices that may be configured for operation by a particular user of IHS 200. For instance, I/O ports 216 may include USB (Universal Serial Bus) ports, by which a variety of external devices may be coupled to IHS 200. In addition to or instead of USB ports, I/O ports 216 may include various types of physical I/O ports that are accessible to a user via the enclosure of the IHS 200.

In certain embodiments, chipset 203 may additionally utilize one or more I/O controllers 210 that may each support the operation of hardware components such as user I/O devices 211 that may include peripheral components that are physically coupled to I/O port 216 and/or peripheral components that are wirelessly coupled to IHS 200 via network interface 209. In various implementations, I/O controller 210 may support the operation of one or more user I/O devices 211 such as a keyboard, mouse, touchpad, touchscreen, microphone, speakers, camera and other input and output devices that may be coupled to IHS 200. User I/O devices 211 may interface with an I/O controller 210 through wired or wireless couplings supported by IHS 200. In some cases, I/O controllers 210 may support configurable operation of supported peripheral devices, such as user I/O devices 211.

As illustrated, a variety of additional resources may be coupled to the processor(s) 201 of the IHS 200 through the chipset 203. For instance, chipset 203 may be coupled to network interface 209 that may support different types of network connectivity. IHS 200 may also include one or more Network Interface Controllers (NICs) 222 and 223, each of which may implement the hardware required for communicating via a specific networking technology, such as Wi-Fi, BLUETOOTH, Ethernet and mobile cellular networks (e.g., CDMA, TDMA, LTE). Network interface 209 may support network connections by wired network controllers 222 and wireless network controllers 223. Each network controller 222 and 223 may be coupled via various buses to chipset 203 to support different types of network connectivity, such as the network connectivity utilized by IHS 200.

Chipset 203 may also provide access to one or more display device(s) 208 and 213 via graphics processor 207. Graphics processor 207 may be included within a video card, graphics card or within an embedded controller installed within IHS 200. Additionally, or alternatively, graphics processor 207 may be integrated within processor 201, such as a component of a system-on-chip (SoC). Graphics processor 207 may generate display information and provide the generated information to one or more display device(s) 208 and 213, coupled to IHS 200.

One or more display devices 208 and 213 coupled to IHS 200 may utilize LCD, LED, OLED, or other display technologies. Each display device 208 and 213 may be capable of receiving touch inputs such as via a touch controller that may be an embedded component of the display device 208 and 213 or graphics processor 207, or it may be a separate component of IHS 200 accessed via bus 202. In some cases, power to graphics processor 207, integrated display device 208 and/or external display device 213 may be turned off, or configured to operate at minimal power levels, in response to IHS 200 entering a low-power state (e.g., standby).

As illustrated, IHS 200 may support an integrated display device 208, such as a display integrated into a laptop, tablet, 2-in-1 convertible device, or mobile device. IHS 200 may also support use of one or more external display devices 213, such as external monitors that may be coupled to IHS 200 via various types of couplings, such as by connecting a cable from the external display device 213 to external I/O port 216 of the IHS 200. In certain scenarios, the operation of integrated display devices 208 and external display devices 213 may be configured for a particular user. For instance, a particular user may prefer specific brightness settings that may vary the display brightness based on time of day and ambient lighting conditions.

Chipset 203 also provides processor 201 with access to one or more storage devices 219. In various embodiments, storage device 219 may be integral to IHS 200 or may be external to IHS 200. In certain embodiments, storage device 219 may be accessed via a storage controller that may be an integrated component of the storage device. Storage device 219 may be implemented using any memory technology allowing IHS 200 to store and retrieve data. For instance, storage device 219 may be a magnetic hard disk storage drive or a solid-state storage drive. In certain embodiments, storage device 219 may be a system of storage devices, such as a cloud system or enterprise data management system that is accessible via network interface 209.

As illustrated, IHS 200 also includes a Basic Input/Output System (BIOS) 217 that may be stored in a non-volatile memory accessible by chipset 203 via bus 202. Upon powering on or restarting IHS 200, processor(s) 201 may utilize BIOS 217 instructions to initialize and test hardware components coupled to the IHS 200. BIOS 217 instructions may also load an operating system (OS) (e.g., WINDOWS, MACOS, iOS, ANDROID, LINUX, etc.) for use by IHS 200.

BIOS 217 provides an abstraction layer that allows the operating system to interface with the hardware components of the IHS 200. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 200 embodiments may utilize sensor hub 214 capable of sampling and/or collecting data from a variety of sensors. For instance, sensor hub 214 may utilize hardware resource sensor(s) 212, which may include electrical current or voltage sensors, that are capable of determining the power consumption of various components of IHS 200 (e.g., CPU 201, GPU 207, system memory 205, etc.). In certain embodiments, sensor hub 214 may also include capabilities for determining a location and movement of IHS 200 based on triangulation of network signal information and/or based on information accessible via the OS or a location subsystem, such as a GPS module.

In some embodiments, sensor hub 214 may support proximity sensor(s) 215, including optical, infrared, and/or sonar sensors, which may be configured to provide an indication of a user's presence near IHS 200, absence from IHS 200, and/or distance from IHS 200 (e.g., near-field, mid-field, or far-field).

In certain embodiments, sensor hub 214 may be an independent microcontroller or other logic unit that is coupled to the motherboard of IHS 200. Sensor hub 214 may be a component of an integrated system-on-chip incorporated into processor 201, and it may communicate with chipset 203 via a bus connection such as an Inter-Integrated Circuit (I²C) bus or other suitable type of bus connection. Sensor hub 214 may also utilize an I²C bus for communicating with various sensors supported by IHS 200.

As illustrated, IHS 200 may utilize embedded controller (EC) 220, which may be a motherboard component of IHS 200 and may include one or more logic units. In certain embodiments, EC 220 may operate from a separate power plane from the main processors 201 and thus the OS operations of IHS 200. Firmware instructions utilized by EC 220 may be used to operate a secure execution system that may include operations for providing various core functions of IHS 200, such as power management, management of operating modes in which IHS 200 may be physically configured and support for certain integrated I/O functions.

EC 220 may also implement operations for interfacing with power adapter sensor 221 in managing power for IHS 200. These operations may be utilized to determine the power status of IHS 200, such as whether IHS 200 is operating from battery power or is plugged into an AC power source (e.g., whether the IHS is operating in AC-only mode, DC-only mode, or AC+DC mode). In some embodiments, EC 220 and sensor hub 214 may communicate via an out-of-band signaling pathway or bus 224.

In various embodiments, IHS 200 may not include each of the components shown in FIG. 2. Additionally, or alternatively, IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as an SoC.

Figure 3:
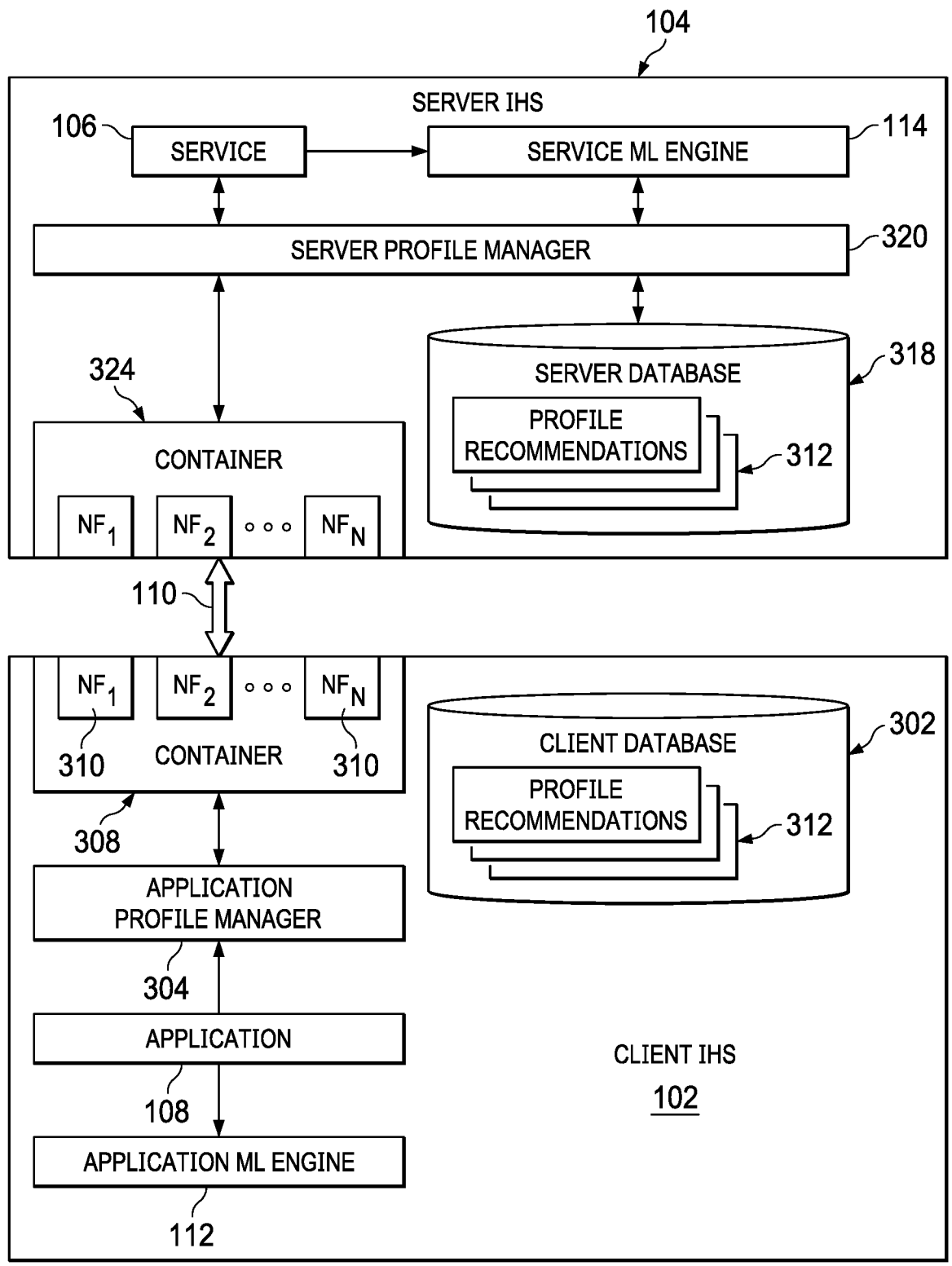
FIG. 3 illustrates several elements of each of a client IHS and a server IHS that may be implemented in cloud computing environment according to one embodiment of the present disclosure.

FIG. 3 illustrates several elements of each of a client IHS 102 and a server IHS 104 that may be implemented in a cloud computing environment according to one embodiment of the present disclosure. As shown, client IHS 102 communicates with a server IHS 104 via a communication network 110, such as a 5G telecommunications network.

In general, fifth generation (5G) cellular networks support large bandwidth communications, of up to 10 gigabits per second, and make new applications possible. 5G also introduces the concept of cellular network slicing. In particular, 5G network slicing enables the multiplexing of virtualized and independent logical networks on the same physical network infrastructure. Each network slice is an isolated end-to-end network tailored to fulfill diverse Quality-of-Service or "QoS" requirements requested by a given application.

Client IHS 102 may represent a wireless communication device (e.g., a phone, a tablet, a watch, a laptop, etc.) associated with a user or recipient of intended wireless communication. Client IHS 102 includes application ML engine 112, a client database 302, and an application profile manager 304 that communicates with one or more applications 108 configured on client IHS 102 to produce a system for optimizing the performance of application 108. Application ML engine 112 receives telemetry data associated with operation of application 108, and classifies network traffic generated by application 108 to use 5G cellular network slices, and generate one or more profile recommendations for optimizing performance of application 108.

Application profile manager 304 may operate as a software agent, in whole or in part, on the client IHS 102 to receive profile recommendations from application ML engine 112 to adjust one or more settings of client IHS 102 to optimize performance of application 108. In one embodiment, application profile manager 304 may be configured to provision a container 308 comprising one or more network functions (NFs) 310. Examples of such containers may include DOCKER, or one that provides clusters of orchestrated containers, such as KUBERNETES. Although application profile manager 304 is shown and described herein to provision a container 308 when requested by client IHS 102, it should be appreciated that application profile manager 304 may be configured to provision other interfaces (e.g., NFs) to communication network, such as physical machines (bare metal machines), virtual machines (VMs), and the like when requested by application 108.

In general, the network functions 310 in container 308 may be used to support communication between client IHS 102 and server IHS 104. That is, NFs 310 are the nodes in the 5G system architecture that provide services for the clients and servers in the network. Examples of network functions (NFs) may include a HTTPS server NF, a database NF, a network element NF, such as a routing function, a host firewall NF, a packet gateway NF, and the like. In many cases, it would be beneficial to specify parameters for these Nfs as they are being provisioned to optimize communication over the network according to a service type (e.g., eMBB, uRLLC, mMTC, and/or some combination thereof). According to embodiments of the present disclosure, application profile manager 304 receives profile recommendations from application ML engine 112 and selects parameters for the Nfs 310 that optimize communication through the 5G network.

Client database 302 is provided for storage of profile recommendations 312 generated by application profile manager 304. When application ML engine 112 generates profile recommendations, they are provided to application profile manager 304 for optimization of application, and to a server profile manager 320 for optimization of service 106. Application profile manager 304 also stores the profile recommendations 312 in database 302 for later use. For example, During a first use of application 108, application profile manager 304 may work in conjunction with server profile manager 320 for cooperative optimization of application 108 and service 106 provided to application 108. Because the profile recommendations 312 are stored, when the application 108 is used at a later date or time to access service 106, application profile manager 304 may access the stored profile recommendations for further optimization of the application 108 and the corresponding service 106 used by the application 108.

As shown, server IHS 104 may represent a single IHS 104 that serves one or more services 106 to applications 108 upon demand. In other embodiments, server IHS 104 may represent multiple IHSs 104 that function together in order to serve one or more services 106 to application 108. Server IHS 104 includes service 106, service ML engine 114, a server database 318, and a server profile manager 320 that communicates with one or more services 106 configured on server IHS 104 to produce a system for providing services 106 to client IHS 102 using profile recommendations obtained from service ML engine 114 as well as profile recommendations obtained from application ML engine 112.

service ML engine 114 receives telemetry data associated with operation of service 106, and generates one or more profile recommendations for optimizing performance of service 106. Server profile manager 320 may operate as a software agent, in whole or in part, on server IHS 104 to receive profile recommendations from service ML engine 114 and adjust one or more settings of service 106 to optimize its performance. Similar to application profile manager 304, server profile manager 320 may be configured to provision a container 324 comprising one or more network functions 326 that function as an interface to the communication network 110.

Application ML engine 112 and service ML engine 114 each monitors data associated with the operation of target application 108 and service 106 to characterize their performance. For example, application ML engine 112 or service ML engine 114 may each obtain telemetry data from other process running on client IHS 102 and/or directly from sensors 212, 215, 221 configured in IHS 100 to determine one or more performance features associated with target application 108 or service 106, respectively. In various embodiments, application ML engine 112 or service ML engine 114 may obtain telemetry data from an energy estimation engine, such as the MICROSOFT E3 engine, which is configured to provide energy usage data broken down by applications, services, tasks, and/or hardware in an IHS. In some cases, the process (e.g., energy estimation engine) may use software and/or hardware sensors configured to determine, for example, whether target application 108 is being executed in the foreground or in the background (e.g., minimized, hidden, etc.) of the IHS's graphical user interface (GUI).

Figure 4B:
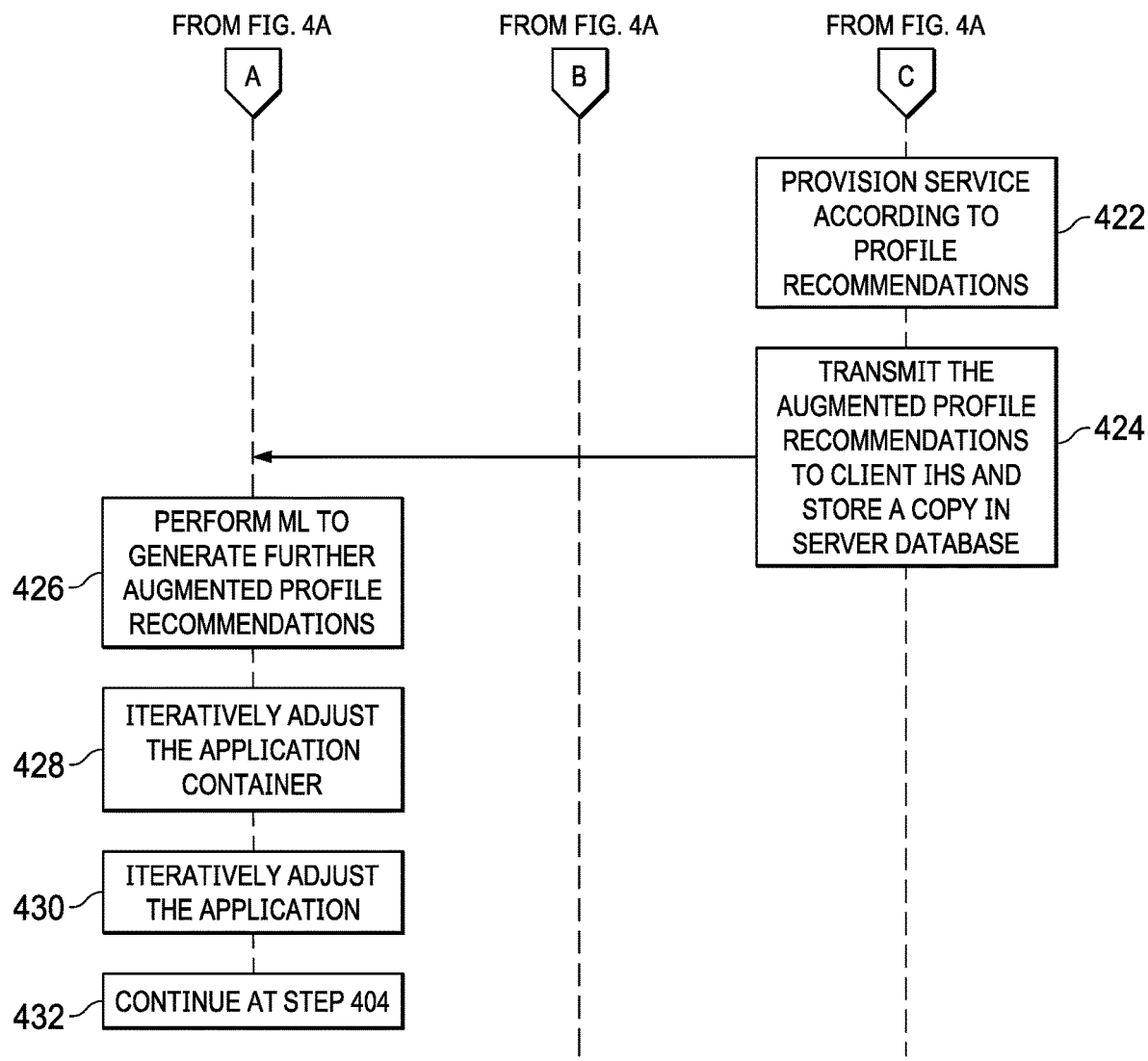

Once application ML engine 112 or service ML engine 114 has collected characteristics over a period of time, it may then process the collected data using statistical descriptors to extract the application performance features of target application 108 or service 106, respectively. For example, application ML engine 112 and service ML engine 114 may monitor their respective IHSs over time to estimate its resource usage with respect to various aspects, such as which actions performed by target application 108 cause certain resources to encounter loading, events occurring on client IHS 102 that causes target application 108 to require a relatively high level of resource usage, and a time period of day in which these actions are encountered. Once application ML engine 112 and service ML engine 114 have collected characteristics over a period of time, they may then process the collected data using statistical descriptors to extract the application performance features associated with target application 108 or service 106. Both or either of service ML engine 114 and application ML engine 112 may use a machine learning algorithm such as, for example, a Bayesian algorithm, a Linear Regression algorithm, a Decision Tree algorithm, a Random Forest algorithm, a Neural Network algorithm, or the like. In one embodiment, application profile manager 304 and/or server profile manager 320 may include features, or form a part of, the DELL PRECISION OPTIMIZER FIG. 4 illustrates a method 400 depicting how client IHS 102 may function with server IHS 104 to provide and end-to-end (E2E) optimization of a service 106 provided to an application 108. In particular, steps 402-406, 410, 412, and 426-430 are those that may be performed by client IHS 102, steps 414-418, 422, and 424 are those that may be performed by server IHS 104, and steps 408 and 420 are those that may be performed by cloud communication network 110. It is important to note that the steps of the disclosed method 400 may be performed multiple times during a communication session between client IHS 102 and server IHS 104 to iteratively optimize performance of application 108 and service 106. That is, the steps may be performed a first time to initially set up a link (e.g., slice) between client IHS 102 and server IHS 104 and cooperatively optimize performance of application 108 and service 106, and at a later point in time, perform the steps of the method 400 again to iteratively enhance performance of the application 108 and service 106.

At step 402, application profile manager 304 obtains telemetry attributes about application 108. If the method 400 is being performed for the first time, application profile manager 304 may obtain telemetry data about application 108 that has been obtained during a previous use of application 108, such as when the application 108 accessed a different service from cloud communication network 110. Additionally, application profile manager 304 may obtain generic information about a service type (e.g., eMBB, uRLLC, mMTC) that may be associated with the application 108 to obtain the telemetry data. If, however, the method 400 is being performed again, application profile manager 304 may obtain telemetry attributes associated with the application 108 that has been obtained since the previous time that method 400 was performed. These telemetry attributes may be used by application ML engine 112 to generate initial profile recommendations to application profile manager 304 at step 404. Thereafter at step 406, application profile manager 304 provisions a container 308 for establishing communication through the cloud communication network 110 based on the profile recommendations received from application ML engine 112. The cloud communication network 110 then receives attributes associated with the container 308 to allocate a link between client IHS 102 and server IHS 104 at step 408. In a particular embodiment in which cloud communication network 110 comprises a 5G network, a slice may be instantiated.

At step 410, application profile manager 304 optimizes application 108 according to the profile recommendations generated by application ML engine 112. Application profile manager 304 may optimize application in any suitable manner. In one embodiment, application profile manager 304 optimizes application 108 by optimizing one or more resources, such as CPU 201, GPU 207, and/or storage (e.g., system memory 205), that are used to support execution of application 108 on client IHS 102. For example, application profile manager 304 may optimize CPU 201 by adjusting a power level applied to the CPU, and/or adjusting an overclocking or underclocking level of the CPU. Application profile manager 304 may also optimize GPU 207 by adjusting one or more of a frame rate, often rated in frames per second (FPS), a refresh rate, or a computational frame rate of the GPU. For another example, application profile manager 304 may optimize storage by adjusting a write optimized setting or a read optimized setting of the storage unit, or by increasing or decreasing its cache size in RAM memory to handle the level of load incurred by the storage resource.

At step 412, application profile manager 304 transmits the profile recommendations to server IHS 104 and stores a copy (e.g., snapshot) of the profile recommendations in client database 302. Service ML engine 114 receives these profile recommendations (step 414) and, along with telemetry data obtained about service 106, generates augmented profile recommendations to server profile manager 320 at step 416. Within this disclosure, augmented profile recommendations refers to profile recommendations associated with service 106 that have been augmented to include profile recommendations generated according to operation of application 108.

Thereafter at step 418, server profile manager 320 provisions a server container 324 for establishing communication through the cloud communication network 110 to communicate with application 108 running on client IHS 102 using augmented profile recommendations obtained from both application ML engine 112 and service ML engine 114. Cloud communication network 110 then adjusts link (e.g., slice) according to the attributes generated in the server container 324 at step 420.

Server profile manager 320 also provisions service 106 using the augmented profile recommendations provided by service ML engine 114 and application ML engine 112 at step 422. For example, server profile manager 320 may provision service 106 by adjusting the resources (e.g., CPU, GPU, storage, etc.) of the server IHS 104 used to support or execute the service 106. At step 424, server profile manager 320 transmits the augmented profile recommendations to client IHS 102, and stores a copy in server database 318.

At step 426, application ML engine 112 generates further augmented profile recommendations based upon the augmented profile recommendations obtained from server profile manager 320 along with its profile recommendations generated at step 404. At step 428, application profile manager 304 uses the further augmented profile recommendations to iteratively adjust the settings associated with client container 308 to iteratively enhance its performance, and step 430, it uses those further augmented profile recommendations to iteratively adjust setting associated with application 108.

At this point, service 106 has been provisioned for use by application 108 and a communication link is established between client IHS 102 and server IHS 104 so that application 108 may consume resources (e.g., information, calculations, algorithms, etc.) provided by service 106. Moreover, both application 108 and service 106 have been optimized based upon telemetry data obtained about their own operation as well as the operation of each other.

At step 432, the method continues processing at step 404 to iteratively optimize service and link according to application requirements. That is, as application 108 continues to use service 106, the steps of method 400 may be repeatedly performed for further optimization of both application 108 and service 106. The steps of method 400 may be repeated at any suitable time. For example, the steps of method 400 may be continually performed at specified ongoing time intervals (e.g., every 5 seconds, every 30 seconds, every 2 minutes, etc.) so that the performance of application 108 and service 106 can be continually optimized. In another embodiment, either or both of application profile manager 304 or server profile manager 320 may be triggered to perform the steps of method 400 when a specified threshold of a particular telemetry data element has been crossed, such as when a user begins to use application 108 in a different manner, thus yielding a new set of profile recommendations that should be used to optimize performance of each of the application 108 and the service 106 used by application 108. In yet another embodiment, the steps of method 400 may be performed again, even after a period of time in which application 108 does not use or access service 106, such as when the client IHS 102 is turned off, or when application 108 is not being currently executed on client IHS 102. In such a case, when application 108 again requests to communicate with service 106, application profile manager 304 may access client database 302 to determine whether profile recommendations for that application 108 requesting to use the specified service 106 are found, and if so, application profile manager 304 may access the profile recommendations 312 stored in client database 302, and continue operation through the other steps of method 400. Nevertheless, when use of the method 400 is no longer needed or desired, the method 400 ends.

Although FIG. 4 describes one example of a process that may be performed by IHS 100 for enhancing a performance level of a target application and a service 106 provided to application 108, the features of the disclosed process may be embodied in other specific forms without deviating from the spirit and scope of the present disclosure. For example, certainly steps of the disclosed process may be performed sequentially, or alternatively, they may be performed concurrently. As another example, the method 400 may perform additional, fewer, or different operations than those operations as described in the present example. As yet another example, the steps of the process described herein may be performed by a computing system other than client IHS 102, such as by another cloud service existing in the cloud network that communicates with client IHS 102 to implement the ML enhancement features described above.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterward be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   at least one processor; and
   at least one memory coupled to the at least one processor, the at least one memory having program instructions stored thereon that, upon execution by the at least one processor, cause the IHS to:
   determine one or more application performance features of a target application using an application machine learning (ML) engine;
   generate one or more application profile recommendations for the target application according to the determined application performance features;
   adjust one or more settings of the IHS to optimize a performance of the target application; and
   transmit the one or more application profile recommendations to a cloud server that is configured to provide a cloud service for the target application, wherein the server is configured to use the one or more application profile recommendations to provision a communication link between the IHS and the server to provide the service for use by the target application.

2. The IHS of claim 1, wherein the communication link comprises a slice of a fifth generation (5G) technology cellular network.

3. The IHS of claim 1, wherein the instructions are further executed to provision the communication link by generating a container comprising one or more network functions (NFs).

4. The IHS of claim 1, wherein the server is configured to provision the service by:
   determining one or more service performance features of the service using a service ML engine;
   generate one or more service profile recommendations for the service according to the determined service performance features; and
   adjust, using the service profile recommendations, one or more settings of the service to optimize a performance of the service.

5. The IHS of claim 4, wherein the server is further configured to:
   store the service profile recommendations in a server memory; and
   at a later point in time when a communication link between the IHS and the server is deleted and then re-established, adjust one or more settings of the service to optimize the performance of the service using the service profile recommendations.

6. The IHS of claim 4, wherein the instructions are further executed to:
   receive the service profile recommendations from the server;
   augment the application profile recommendations according to the received service profile recommendations; and
   adjust the settings of the IHS to further optimize the performance of the target application.

7. The IHS of claim 1, wherein the instructions are further executed to:
   repeat the actions of determining the application profile recommendations, generating the profile recommendations, adjusting the settings, and transmitting the application profile recommendations to the server at ongoing intervals.

8. The IHS of claim 1, wherein the instructions are further executed to:
   repeat the actions of determining the application profile recommendations, generating the profile recommendations, adjusting the settings, and transmitting the application profile recommendations to the server when a specified threshold of at least one of the application performance features telemetry data element has been triggered.

9. The IHS of claim 1, wherein the instructions are further executed to transmit the application profile recommendations to the server using a ML hinting technique.

10. A method comprising:
    determining, using instructions stored in at least one memory and executed by at least one processor, one or more application performance features of a target application using an application machine learning (ML) engine;

generating, using the instructions, one or more application profile recommendations for the target application according to the determined application performance features;
adjusting, using the instructions, one or more settings of an information handling system (IHS) to optimize a performance of the target application; and
transmitting, using the instructions, the one or more application profile recommendations to a server that is configured to provide a service for the target application, wherein the server uses the one or more application profile recommendations to provision a communication link between the IHS and the server to provide the service for use by the target application.

11. The method of claim 10, further comprising provisioning the communication link by generating a container comprising one or more network functions (NFs).

12. The method of claim 10, further comprising:
determining one or more service performance features of the service using a service ML engine;
generating one or more service profile recommendations for the service according to the determined service performance features; and
adjusting, using the service profile recommendations, one or more settings of the service to optimize a performance of the service.

13. The method of claim 12, further comprising:
storing the service profile recommendations in a server memory; and
at a later point in time when a communication link between the IHS and the server is deleted and then re-established, adjusting one or more settings of the service to optimize a performance of the service using the service profile recommendations.

14. The method of claim 12, further comprising:
receiving the service profile recommendations from the server;
augmenting the application profile recommendations according to the received service profile recommendations; and
adjusting the settings of the IHS to further optimize the performance of the target application.

15. The method of claim 10, further comprising:
repeating the actions of determining the application profile recommendations, generating the profile recommendations, adjusting the settings, and transmitting the application profile recommendations to the server at ongoing intervals.

16. The method of claim 10, further comprising:
repeating the actions of determining the application profile recommendations, generating the profile recommendations, adjusting the settings, and transmitting the application profile recommendations to the server when a specified threshold of at least one of the application performance features telemetry data element has been triggered.

17. The method of claim 10, further comprising transmitting the application profile recommendations to the server using a ML hinting technique.

18. A memory storage device having program instructions stored thereon that, upon execution by one or more processors of an Information Handling System (IHS), cause the IHS to:
determine one or more application performance features of a target application using an application machine learning (ML) engine;
generate one or more application profile recommendations for the target application according to the determined application performance features;
adjust one or more settings of the IHS to optimize a performance of the target application; and
transmit the one or more application profile recommendations to a server that is configured to provide a service for the target application, wherein the server is configured to use the one or more application profile recommendations to provision a communication link between the IHS and the server to provide the service for use by the target application.

* * * * *